United States Patent [19]

Legrand et al.

[11] Patent Number: 4,635,095
[45] Date of Patent: Jan. 6, 1987

[54] METHOD FOR MEASURING THE CONVERGENCE OF A THREE-GUN SHADOW-MASK CATHODE-RAY TUBE AND A DEVICE FOR THE APPLICATION OF SAID METHOD

[75] Inventors: Guy Legrand, Ruff les Echirey; Michel Faivre, Dijon, both of France

[73] Assignee: Videocolor, Montrouge, France

[21] Appl. No.: 591,749

[22] Filed: Mar. 21, 1984

[30] Foreign Application Priority Data

Mar. 25, 1983 [FR] France .................. 83 04981

[51] Int. Cl.⁴ ............................................. H04N 17/02
[52] U.S. Cl. ........................................ 358/10; 315/368
[58] Field of Search ............. 358/10, 65, 139, 107; 315/368

[56] References Cited

U.S. PATENT DOCUMENTS

| 4,001,877 | 1/1977 | Simpson | 358/10 |
| 4,316,211 | 2/1982 | Mackey et al. | 358/10 |
| 4,364,079 | 12/1982 | Pons | 358/10 |
| 4,441,120 | 4/1984 | Gerritsen | 358/10 |
| 4,551,748 | 11/1985 | Mattle | 358/10 |

FOREIGN PATENT DOCUMENTS

| 30259 | 6/1981 | European Pat. Off. . | |
| 0107678 | 7/1982 | Japan | 358/10 |
| 2048625 | 12/1980 | United Kingdom | 358/10 |

Primary Examiner—John W. Shepperd
Assistant Examiner—Michael P. Dunnam
Attorney, Agent, or Firm—Pollock, VandeSande & Priddy

[57] ABSTRACT

Monochrome bar patterns approximately seven millimeters in width are produced on the screen of a three-color television picture tube by means of a video signal having a substantially Gaussian waveform. The value of the convergence component is given by the distance between centers of two bars of different colors. Measurement of convergence is carried out by means of a photosensor consisting of a charge-coupled photosensitive strip and an optical system comprising a biconvex lens and a cylindrical lens.

10 Claims, 8 Drawing Figures

METHOD FOR MEASURING THE CONVERGENCE OF A THREE-GUN SHADOW-MASK CATHODE-RAY TUBE AND A DEVICE FOR THE APPLICATION OF SAID METHOD

BACKGROUND OF THE INVENTION

1. Field of the Invention

The present invention relates to a method for measuring the convergence of a three-gun shadow-mask cathode-ray tube and is also concerned with a device for carrying out said method.

2. Description of the Prior Art

In a known method for scanning the convergence of an in-line three-gun cathode-ray tube as disclosed in French Pat. No. 2 480 032, the light intensity of a vertical or horizontal monochrome luminous line which moves on the screen of the tube is measured through a scanning slit. A method of this type calls for special scanning circuits which are different from conventional circuits and therefore cannot be employed in television receivers without modifying these latter.

SUMMARY OF THE INVENTION

This invention relates to a method for measuring the convergence of a cathode-ray tube of the aforementioned type, said tube being connected to conventional scanning circuits, the measurement being performed without intervention or modification of these scanning circuits and without introducing any criteria which are dependent on human appreciation, the accuracy thereby achieved being better than 1/10 of a millimeter.

A further object of the invention is to provide a method for measuring the convergence of a cathode-ray tube of the aforesaid type, said tube being mounted in a television receiver fitted with a connection of the "Peritel" type for injecting a monochrome video signal into each of the three corresponding guns of the cathode-ray tube.

Yet another object of the present invention is to provide a device for carrying out the method in accordance with the invention, this device being both simple and inexpensive to manufacture.

The method in accordance with the invention consists in producing on the screen of the cathode-ray tube, in each of the zones in which it is desired to measure the convergence, fixed vertical or horizontal monochrome bars of two different alternate primary colors and having a width at least equal to approximately seven millimeters. These bars extend respectively over a screen height or width of at least one centimeter on each side of the measurement point, the light intensity of these bars being modulated in accordance with a law which is at least approximately Gaussian. The method further consists in determining the photocenter of said bars in respect of each of the two primary colors considered and in measuring the distance between the photocenters of the two aforesaid bars if said distance is not zero. This distance is a measure of the horizontal or vertical component of the convergence of the cathode-ray tube in the zone considered in the case of a measurement performed on vertical or horizontal bars respectively.

In accordance with an advantageous feature of the invention, the monochrome beam modulation signal for producing said vertical or horizontal bars is generated in digital code and presented in the form of a succession of stair-steps numbering between seven and fifteen approximately, depending on the faceplate size of the cathode-ray tube to be measured. The first half of these steps has a constantly increasing level. The second half has a level which decreases constantly and preferably in a symmetrical manner with respect to the first half. The level of the flat top of the first and last steps is just sufficient to ensure that the illumination of the corresponding phosphors can be detected by the sensor. The maximum amplitude of this signal is such that it does not produce saturation of said sensor. The time-duration of the flat tops of said steps is substantially identical for all steps and is equal to approximately 70 nanoseconds in the case of the vertical bars and 64 microseconds in the case of the horizontal bars, with the result that these bars have a width of approximately 7 millimeters.

The measuring device in accordance with the invention comprises a generator which is preferably of the digital type for producing horizontal and vertical bars of the type defined in the method and which is connected through a selector to the electron guns of the cathode-ray tube, and at least one photosensor connected to a computation circuit which is synchronized with said selector. Said computation circuit determines the relative locations, with respect to a reference point of the sensor, of each of said photocenters and calculates their mutual distance. In accordance with a distinctive feature of the invention, the sensor essentially comprises a photosensitive transducer of the type consisting of a charge-coupled photosensitive strip consisting of a large number such as 1024, for example, of aligned photodiodes, and an optical system placed in front of the transducer. Along the longitudinal axis of the transducer, the magnification of said optical system is substantially equal to the ratio between the length of the active portion of the transducer and twice or three times the widths of the bars obtained on the screen. In the direction at right angles to said longitudinal axis of the transducer, the magnification of said optical system is substantially equal to the ratio between the width of said active portion of the transducer and the distance between the centers of two consecutive phosphors of one and the same column of phosphors of the screen of the cathode-ray tube. Advantageously, said optical system comprises a cylindrical lens and a biconvex lens.

BRIEF DESCRIPTION OF THE DRAWINGS

Other features of the invention will be more apparent upon consideration of the following description and accompanying drawings, wherein.

DETAILED DESCRIPTION OF THE INVENTION

Figure 1:
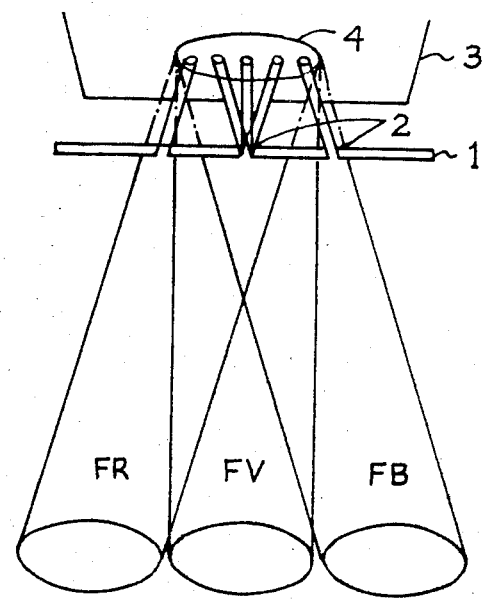
FIG. 1 is a simplified diagram illustrating the conditions of convergence of three electron beams emerging from three in-line electron guns in a color television cathode-ray tube (picture tube)

FIG. 1 illustrates the optimum conditions of convergence in a color television picture tube. In the remainder of the description, the different elements of the tube corresponding to each electron gun and the columns of luminophors (referred to hereinafter as "phosphors") deposited on the internal surface of the picture-tube screen will be designated by one of the letters R, V or B according to the primary color considered or, in other words, red, green and blue in the case of a three-color tube. In consequence, the three beams $F_R$, $F_V$ and $F_B$ produced by the three in-line electron guns of the cathode-ray tube reach the shadow mask 1 at different angles of incidence in order to carry out selection of colors. As clearly shown in FIG. 1, only those fractions (a small proportion) of the beams which pass through the apertures 2 of the mask 1 arrive at the screen in order to illuminate columns of phosphors. The angles of incidence of the electron beams $F_R$ and $F_B$ with respect to the beam $F_V$ which strikes the screen at zero incidence are the main parameters of purity control of the cathode-ray tube. If the tube is purity-controlled, each electron beam which passes through any one aperture of the mask can only arrive at a column of phosphors corresponding to its own color. The presence of the mask 1 considerably complicates the scanning of convergence of the three beams. In fact, a convergence is considered as optimum when the three beams strike a given zone 4 of the screen 3 at a given instant (during the scanning operation). In other words, the three light spots produced by the three beams must coincide on the screen 3. In point of fact, this single spot is fictitious since it is not observable on the screen by reason of the presence of the mask.

Figure 2:
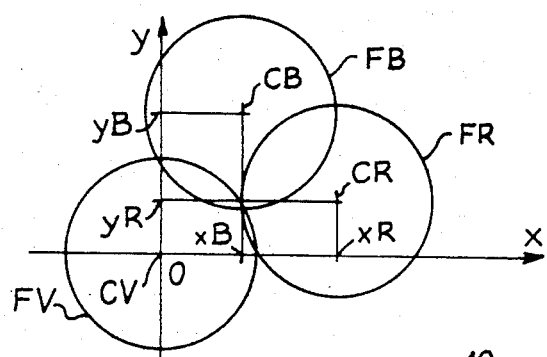
FIG. 2 is a diagram illustrating a situation of non-convergence between the three aforesaid electron beams.

FIG. 2 is a schematic representation of a situation of non-convergence which is equally fictitious (that is to say in which it is assumed that the mask 1 has been removed) at a given location of the screen and when the electron beams are not subjected to any scanning operation. It is apparent that the deviations in convergence can be defined by means of projections of the centers $C_R$, $C_V$ and $C_B$ three beams in a reference frame of orthonormal coordinates xoy. As will readily be understood, the axis ox will preferably be parallel to the direction of horizontal deflection of the tube and the axis oy will preferably be parallel to the direction of vertical deflection. The center $C_V$ shown in the example of FIG. 2 coincides with the origin of the reference frame xoy and it is apparent that the projections $x_R$, $x_B$ and $y_R$, $y_B$ of the centers $C_R$ and $C_B$ on the axes ox and oy respectively are sufficient to provide a complete definition of the convergence deviations between the three electron beams. However, once again, this static situation illustrated in FIG. 2 is not observable on the one hand because of the presence of the mask and on the other hand because of the difficulty involved in observing the impacts of the motionless beams. It is for this reason that the known methods of observation of convergence are employed in conjunction with screen scanning by means of a "pattern" composed of horizontal and vertical lines of the three colors. The horizontal component of convergence deviation (hereinafter designated as "vertical convergence") between two different colors is the distance between the vertical lines of these two colors and the vertical component of convergence deviation (hereinafter designated as "horizontal convergence") is the distance between the corresponding horizontal lines.

Figure 3:
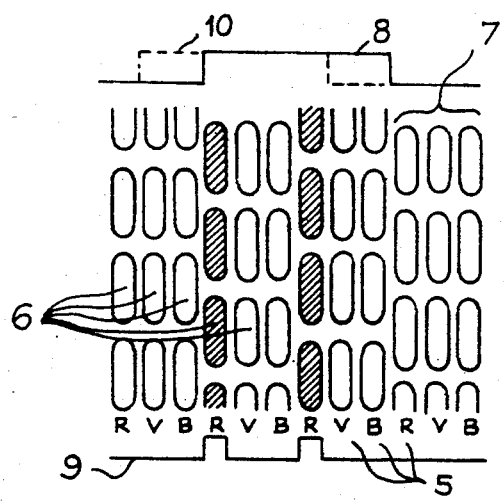
FIG. 3 is an enlarged plan view of a zone of the picture-tube screen in which it is desired to measure deviations in horizontal convergence, a vertical bar of a conventional bar pattern being produced in this zone.

FIG. 3 illustrates a small portion of the picture-tube screen (viewed from the exterior) with a certain number of phosphor columns 5 which are substantially vertical when considering the normal display position of the television picture tube. The colors corresponding to the different columns 5 are designated at the top of FIG. 3 by letters R, V, B. By reason of the presence of the mask behind the screen, illumination of the columns of phosphors results in the formation of multiple images 6 of the mask apertures (in the case of slot-masks, the apertures have an oblong shape, the longest dimension of which is oriented in the direction of the columns). These images appear in the form of three-color triads 7 by reason of the differences in incidence of the three electron beams (as shown in FIG. 1). As will readily be apparent, the columns of phosphors have different chemical compositions in order to correspond to the three primary colors and are arranged in a predetermined repetitive sequence (red, green, blue when viewed from the exterior of the picture tube) and with a predetermined pitch in relation to the aperture pitch of the mask 1. For evident reasons of mechanical strength, the oblong apertures 2 of the mask are arranged in staggered relation and the same applies to the corresponding triads 7.

If the screen of the cathode-ray tube is illuminated with a conventional bar pattern providing vertical monochrome bars having a width of approximately 1.5 mm, each bar is actually displayed in the form of two to three vertical lines located side by side. These lines result from the illumination of two or three columns of phosphors (represented as shaded in FIG. 3) having the same color such as red, for example, and forming part of adjacent columns of phosphor triads. Bars of this type are produced by applying a video signal such as the signal 8 shown partially in FIG. 3 to one of the electron guns of the cathode-ray tube, for example the gun corresponding to red. In order to measure the convergence between red and blue, for example, the same signal 8 is then applied to the gun corresponding to blue. There is then obtained another series of bars which are similar to the red bars but produced by illumination of columns of blue phosphors. A measurement of the vertical convergence of the cathode-ray tube in a given zone consists in measuring in this zone the distance between the vertical bars of the two colors considered or more precisely between the midpoints of said bars. As will readily be apparent, the video signal which produces these bars is such that, in the case of each of the three colors, the signal in fact produces a bar which passes substantially at the center of the zone considered.

If a suitable photosensor is placed on the external face of the picture-tube screen in the zone in which a red bar is produced, there is collected at the output of said sensor a signal such as the signal 9 shown in FIG. 3. If a video signal such as the signal 10 of FIG. 3 were applied to the same electron gun (the signal 10 leads with respect to the signal 8 by an amount equivalent to the time taken by the electron beam of the gun to traverse twice the pitch of the phosphor columns 5 on the screen), the same red phosphor columns would be illuminated and said photosensor would produce the same signal 9. In consequence, this results in an error in the determination of the midpoint of the red bar (this is clearly also the case with the other two primary colors). In other words, by reason of the presence of the mask 1 of the cathode-ray tube, there is a possibility in certain extreme cases that the position of a vertical bar cannot be detected to a higher degree of accuracy than twice the pitch of the phosphor columns, namely approximately 0.5 mm. The method of the present invention provides a remedy to this lack of accuracy.

Figure 4:
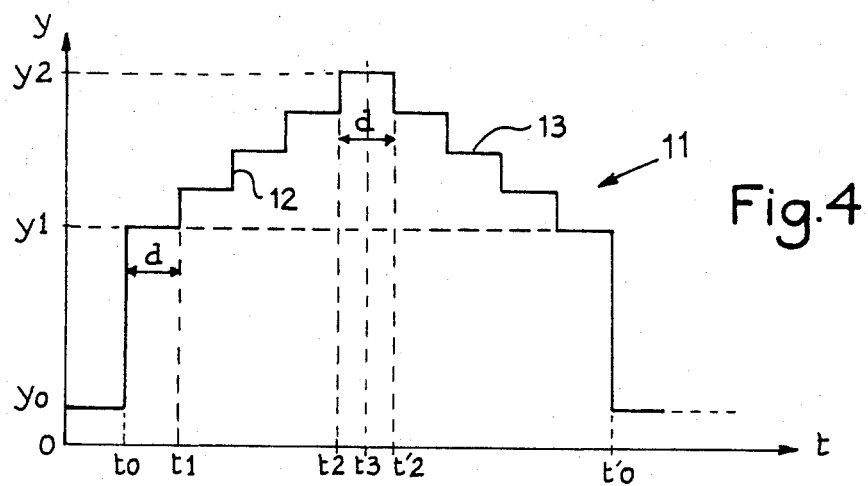
FIG. 4 is a partial chronogram or waveform diagram of a video signal in accordance with the invention.

The method in accordance with the invention first consists in producing a monochromatic video signal (that is to say a signal applied to only one electron gun at a time) having a waveform which is at least approximately Gaussian. This signal makes it possible to obtain on the screen of the cathode-ray tube fixed vertical or horizontal bars having a width of at least seven millimeters approximately. In order that these bars should all be substantially identical and reproducible, an advantageous arrangement contemplated by the invention consists in producing said video signal in digital form, which is thus similar to the signal 11 represented in the waveform diagram of FIG. 4.

The signal 11 consists of a first portion 12 which starts at the instant $t_0$ and ends at the instant $t_3$, the portion 12 being composed of stair-steps of constantly increasing level, and a second portion 13 which starts at the instant $t_3$ and ends at the instant $t'_0$. This second portion 13 is composed of stair-steps of constantly decreasing level. The two portions 12 and 13 are symmetrical with respect to the instant $t_3$ (that is to say symmetrical with respect to the vertical line having an abscissa $t_3$). Prior to the instant $t_0$, the level of the signal 11 is $y_0$, which may be zero or at a maximum such that it does not produce illumination of the picture-tube screen (or in other words does not exceed the level of the mean cathode-ray tube noise in the absence of a video signal). The first step having a level $y_1$ is produced at the instant $t_0$. This level $y_1$ corresponds to illumination which is just perceptible by the sensor. The last step of the portion 12 of the signal 11 is produced at the instant $t_2$ and its level corresponds to optimum use of the dynamic range of the system without producing saturation. Since the portion 13 of the signal 11 is symmetrical with the portion 12, the first step falls from the level $y_2$ at the instant $t'_2$ (which is symmetrical with $t_2$ with respect to $t_3$) and the last step falls from the level $y_1$ to the level $y_0$ at the instant $t'_0$ (which is symmetrical with $t_0$ with respect to $t_3$). The time interval d during which a step is maintained at the level which it has just reached is approximately 70 nanoseconds in the case of vertical bars and 64 microseconds in the case of horizontal bars. It will be noted that the flat top or stair-step interval having a level $y_2$ of the last step of the portion 12 of the signal 11 has a time-duration d in the same manner as the other flat tops of this portion but extends in time from $t_2$ to $t'_2$ which is symmetrical with $t_2$ with respect to $t_3$. Between the levels $y_1$ and $y_2$, the amplitudes of all the steps of the signal 11 are equal. The number of steps is such that the signal 11 produces bars having a width of approximately 7 to 8 mm on the screen of the picture tube. Thus, between the instants $t_0$ and $t'_0$, the number of stair-step intervals of duration d of the signal 11, which is an odd number, can be variable according to the dimensions of the picture-tube screen.

Figure 5:
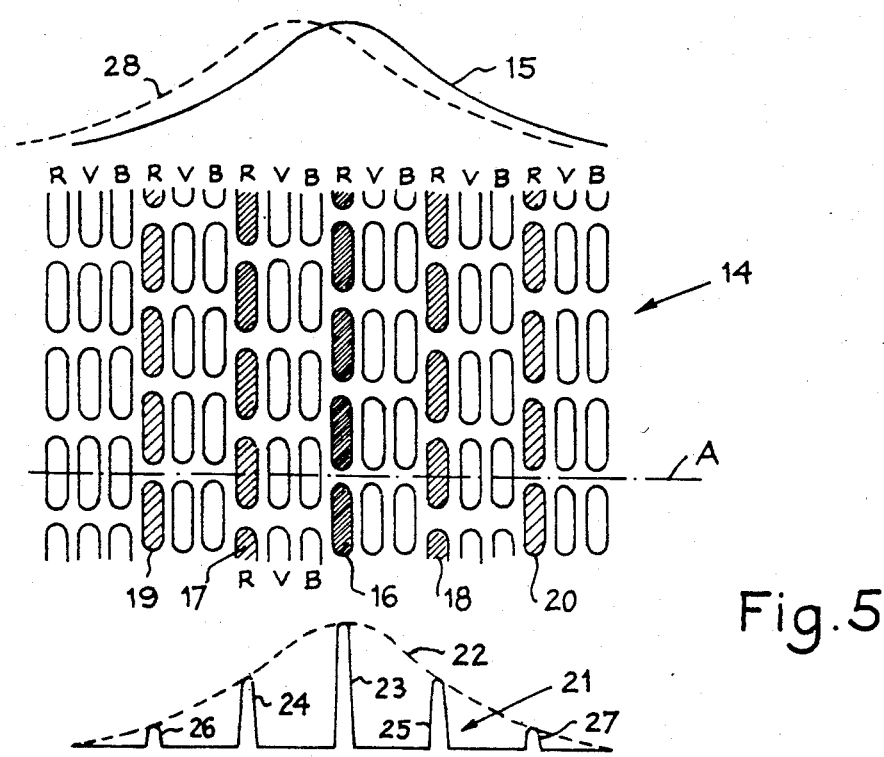
FIG. 5 is an enlarged plan view of a zone of the picture-tube screen in which it is desired to measure the deviations in horizontal convergence, a vertical bar in accordance with the invention being produced in this zone by means of the signal of FIG. 4.
Figure 5:
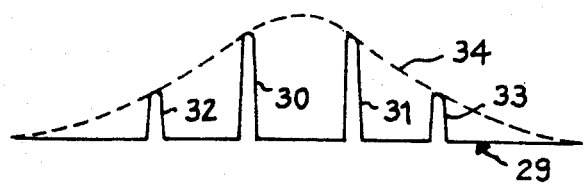

There is shown in the schematic diagram of FIG. 5 an enlarged portion 14 of a vertical bar when the electron gun corresponding to red receives a video signal 15 in accordance with the invention or in other words a signal having a substantially Gaussian waveform. As will readily be apparent, this signal 15 could be digital and could have the waveform of the signal 11 of FIG. 4. The signal 15 which serves to modulate the illumination of the phosphor columns is shown in correspondence with these latter. In the case of FIG. 5, the signal 15 is such that its maximum level coincides with traversal of the beam from the electron gun R to a column 16 of red phosphors. A red column 16 of maximum intensity is then obtained on the screen. The immediately adjacent red columns 17 and 18 located on each side of the phosphor column 16 both have the same brightness but this brightness is of lower intensity than that of the column 16. The following columns 19 and 20 located on each side of the columns 17 and 18 both have substantially the same degree of brightness but, once again, this brightness is lower than that of the columns 17 and 18. The brightness distribution of the columns of the portion 14 follows the Gaussian law of the signal 15. It should be clearly understood that the same applies throughout the length of the red bar, only the portion 14 of which is shown in FIG. 5.

Figure 7:
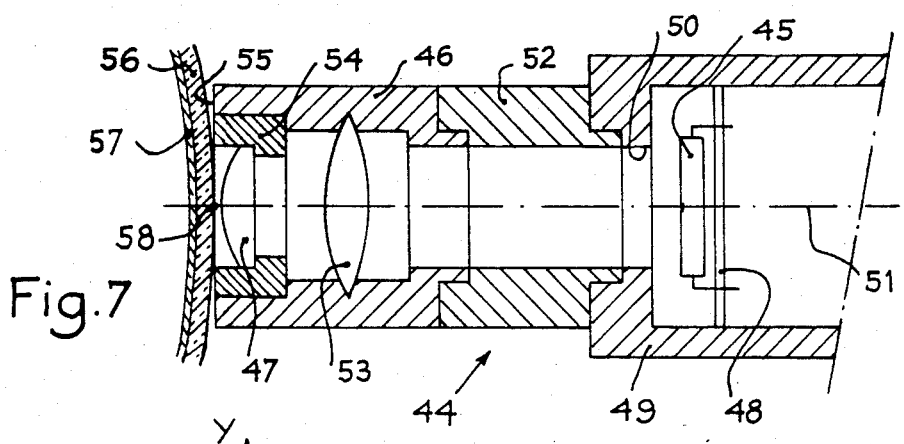
FIG. 7 is a schematic sectional view of a sensor in accordance with the invention.

If a suitable photosensor of the type described hereinafter with reference to FIG. 7 is placed on the front face of the picture-tube screen at the level of the portion 14, there is collected at the photosensor output a signal such as the signal 21 which is shown in FIG. 5 and the envelope 22 of which has the same shape as the signal 15. Said signal 21 has a high central peak 23, the amplitude of which corresponds to the brightness of the column 16, followed by two peaks 24, 25 on each side of the peak 23. The amplitude of said peaks 24, 25 is smaller than that of the peak 23 and corresponds to the brightness of the columns 17 and 18. The signal 21 finally comprises peaks 26 and 27 located on each side of the peaks 24, 25 and of smaller amplitude than these latter. This amplitude corresponds to the brightness of the columns 19, 20.

Postulating that the video signal leads slightly with respect to the signal 15, that said video signal accordingly corresponds to the signal 28 shown in dashed outline in FIG. 5 but that the maximum value of said signal 28 does not correspond to a beam traversal from the electron gun R to the column 16 but to a point located half-way between the columns 17 and 16, for example, there is consequently obtained at the output of the photosensor a signal such as the signal 29 shown at the bottom of FIG. 5. This signal 29 has two high peaks 30, 31 having the same amplitude with smaller peaks 32, 33 on each side. The envelope 34 of the signal 29 has the same shape as that of the signal 28 and the maximum value of this envelope does not correspond to a peak by reason of the fact that the maximum value of the signal 28 does not correspond to a beam traversal from the electron gun R to a column of red phosphors.

The maximum level of the envelope 22 of the signal 21 or of the envelope 34 of the signal 29 defines with a high degree of accuracy the center of the red bar or in other words the precise point of the bar at which this latter produces the same quantity of light in transverse cross-section. In the case of the signal 21, the center of the bar coincides with the center of the peak 23. In the case of the signal 29, the abscissa of the center of the bar is located half-way between the peaks 30 and 31. In contrast to the conventional case illustrated in FIG. 3, the method in accordance with the invention makes it possible to contemplate remedial action in the event of a slight phase shift of the video signal and therefore in the event of a slight displacement of the bar pattern used for measurement. Without displacing the photosensor, the same video signal is switched-over to the blue electron gun and the signal is observed at the output of the sensor. The maximum value of the envelope of this output signal corresponds to the center of the blue bar. After calibration of the sensor, the distance between the center of the red bar and the center of the blue bar gives the value of convergence (expressed in millimeters, for example) in the case of the picture-tube colors which are subjected to measurement. The same procedure is adopted in the case of the green bars by switching the video signal to the green electron gun and observing the signal at the output of the sensor.

According to another aspect of the method considered in the present invention, the position of the center of a vertical bar obtained in the manner described in the foregoing by means of a detector of the type consisting of a high-resolution charge-coupled photosensor, one example of construction of which will be described hereinafter with reference to FIG. 7. This photosensor is placed on the front face of the picture-tube screen at right angles with respect to the bar, in the zone in which it is desired to measure the convergence. The time of measurement is limited to at least 40 ms corresponding to the time required to scan a complete image in accordance with the European standard. In the case of a bar of a first color such as red, for example, this sensor delivers in sampled form a signal such as the signal 21 or 29 of FIG. 5. Said sampled signal is digitized linearly. There is formed on the one hand in the case of all the samples the sum N1 of the products of the numerical value of each sample times the rank of the sample within said sampled signal and, on the other hand, the sum N2 of the numerical values of all of said samples. The rank of the abscissa of the center of the bar (red in the example considered) is given by the ratio N1/N2. A calculation of this type can be carried out by means of a processor which can be readily programmed by anyone versed in the art. Without displacing the sensor, the same video signal is switched-over to the electron gun corresponding to a second color such as blue, for example, and the process described in the foregoing is repeated in the case of red. There is then obtained the rank of the abscissa of the center of the blue bar. After calibration of the sensors (or in other words after establishing the correspondence between difference in rank and real distance on the screen), the difference in rank of the centers of the two red and blue bars gives the value of the horizontal component of convergence in the zone considered and in the case of the two colors considered.

Figure 6:
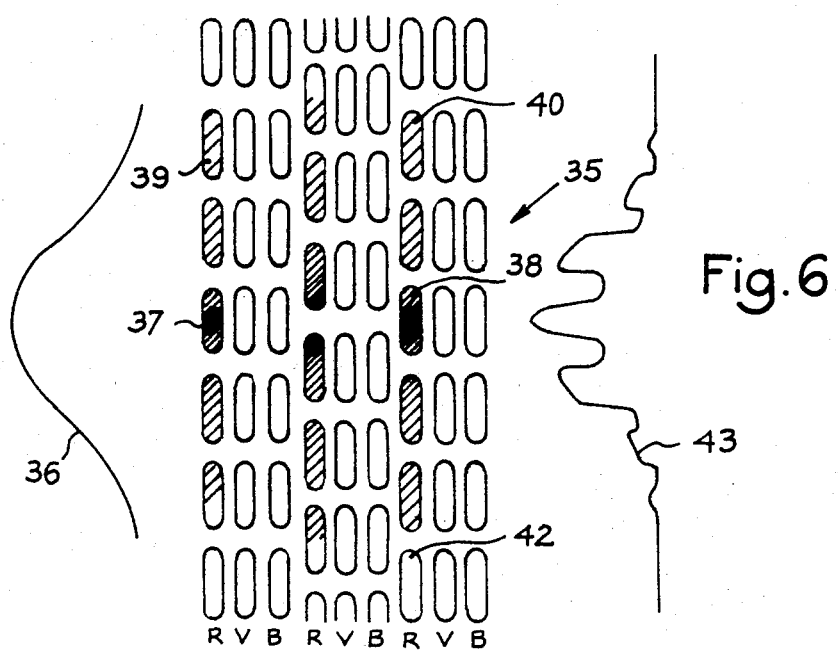
FIG. 6 is an enlarged plan view of a zone of the picture-tube screen in which it is desired to measure the deviations in vertical convergence, a horizontal bar in accordance with the invention being produced in this zone by means of the video signal of FIG. 4.

There is shown in FIG. 6 a portion 35 of a horizontal bar produced by means of the video signal 36 in accordance with the invention in a zone of the screen in which it is desired to measure the "horizontal convergence". In the case illustrated in FIG. 6, the video signal is applied to the red electron gun. The red phosphors such as the phosphors 37 and 38 located at the center of the bar have a maximum brightness level while the red phosphors such as the phosphors 39 to 42 located at the edges of the bar have a minimum brightness level. A photosensor of the type mentioned earlier and placed on the front face of the screen at right angles to the bar collects a signal such as the signal 43 shown in FIG. 6. This signal can be utilized in the same manner as the signal 21 collected for measurement of the "vertical convergence".

There is shown in FIG. 7 a schematic sectional view of a sensor in accordance with the invention for measuring the transverse brightness level of the horizontal and vertical bars produced in accordance with the method of the invention.

The sensor 44 of FIG. 7 comprises a linear photosensitive strip 45 (not shown in detail) composed, for example, of 1024 photodiodes connected to two charge-coupled analog shift registers. The size of each photodiode is $13 \times 8$ microns and the pitch of the strip photodiodes is thirteen microns. The charges acquired by the illuminated photodiodes are transferred in parallel into said analog shift registers. By making use of an external clock (not shown in the drawings) in order to perform a series of shifts, a sampled signal is obtained at the output of the strip when the sensor is placed on the screen of the picture tube at right angles to a bar pattern. The waveform of said sampled output signal is similar to that of the signal 21 of FIG. 5 or to that of the signal 43 shown in FIG. 6, depending on whether the horizontal or vertical convergence is being measured. This output signal is sampled at the frequency of the external clock which carries out the shifts. By counting the periods of the clock signal, it is easy to determine the number of the sample and therefore its rank. Since said shift registers are of the analog type, the amplitude of each sample of the output signal is proportional to the light intensity received.

In order to ensure that the accuracy of determination of the center of the bar pattern employed for measurement of convergence is not liable to be impaired, the strip 45 must scan the entire width of the bar pattern or in other words a width of approximately 7 mm. Should it be desired, for example, to measure convergences up to a maximum width of 10 mm, it must be ensured that the length of the optical field of the sensor 44 is at least 16 mm. In a preferred example of construction, the length of the optical field is 15 mm. Since the size of the photodiodes of the strip 45 is $13 \times 8$ microns, the optical field of said photodiodes would in that case be $15 \times 9$ microns approximately. This field is obtained by means of an objective 46 placed between the strip 45 and the screen. The magnification of this objective must in this case be $13/15 = 0.87$.

A rectangular optical field of this type (having dimensions of 15 microns $\times$ 15 mm) is insufficient to permit measurements of convergence in any position of the sensor on the picture-tube screen. In fact, when performing a measurement on vertical bars, if the longitudinal axis of the photosensitive strip of the sensor is placed substantially opposite to the scanning line A, for example (it is apparent from FIG. 5 that this line A passes half-way between adjacent phosphors of the columns 19, 16 and 20), the sensor will receive practically no light from the phosphors of columns 19, 16 and 20. The reason for this is that the distance between adjacent phosphors of a given column is approximately 0.2 mm whereas the field of the photodiodes of the sensor has a width of only 15 microns. Similarly, when performing a measurement on horizontal bars, if the axis of the photosensitive strip is placed opposite to a column of green or blue phosphors whereas red bars are displayed on the screen, the sensor will receive practically no light from the red phosphors.

In order to circumvent this disadvantage without modifying the length of the field of the sensor (which is 15 mm in the example considered in the foregoing), it is proposed in accordance with the invention to make provision within the sensor for a complementary optical system which modifies only the width of the rectangular optical field of the sensor. The aim of this system is to ensure that, irrespective of its position on the screen of the cathode-ray tube, the sensor can safely be depended upon to receive the light emitted by the phosphors of each column of phosphors which it intersects (in the case of vertical bars) or the light emitted by the column phosphors of the three columns (in the case of horizontal bars). To this end, it is only necessary to ensure that the width of the optical field of the sensor is at least equal to the distance between axes of the phosphors of one and the same column, namely approximately 1.2 mm. The aforesaid complementary optical system can accordingly comprise a cylindrical lens 47 placed between the screen of the cathode-ray tube and the objective 46, the longitudinal axis of which is parallel to the longitudinal axis of the strip 45. Accordingly, the magnification of said objective as considered in a plane at right angles to its longitudinal axis is 15/1200=0.0125.

In the simplified sectional view of the sensor of FIG. 7, the strip 45 is fixed on a support 48 consisting, for example, of a printed circuit base comprising the circuits required for operation of the photosensitive strip. The support 48 is fixed within a dark chamber 49 provided on its front face with a circular opening 50, the axis 51 of which passes through the center of the useful portion of the strip 45. The longitudinal axis of the strip 45 is perpendicular to the axis 51. An extension ring 52 is fixed coaxially with the axis 51 on the front face of the chamber 49 and is followed by the objective 46 which comprises a system of lenses 53. In a preferred example of construction, provision is made for a standard 25 mm objective with an f-number of f/1.4. In conjunction with the standard objective 46, the extension ring is designed to provide the magnification of 0.87 mentioned earlier. It will nevertheless be understood that the extension ring 52 could be dispensed with in the event of adoption of a different type of objective which is alone capable of producing a magnification of 0.87, in which case such an objective would be mounted directly on the chamber 49.

By means of a suitable support 54, the cylindrical lens 47 is fixed on the front face of the objective 46 (that is, the face which is intended to be directed towards the screen) in such a manner as to ensure that the longitudinal axis of said lens is parallel to the longitudinal axis of the strip 45. The length of the lens 47 is equal to or slightly greater than the lens of the optical field of the sensor (namely 15 mm), the center of the lens 47 being located on the axis 51.

The front face 55 of the sensor 44 is applied against the screen 56 of the cathode-ray tube (the photo-emissive internal layer of the screen is designated by the reference 57) in such a manner as to ensure that the axis 51 of the sensor 44 is perpendicular to the plane (not shown) which is tangent to the point of incidence 58 of said axis 51 on the screen 56. The sensor 44 is securely held in this position by means which have not been shown in the drawings. It will clearly be apparent that, should it be desired to perform automatic and rapid measurement of a plurality of zones of the picture-tube screen simultaneously, use is accordingly made of a plurality of identical sensors placed opposite to these zones and suitably fixed in position.

The sensor 44 is connected to a control and processing circuit (not shown) which essentially comprises computing circuits for automatically performing the calculations mentioned above and a circuit for generating bars in accordance with the invention. Said circuit can be connected sequentially to each of the three electron guns of the cathode-ray tube (or at least each of the two guns R and B), each time during intervals of approximately 40 ms. The sensor further comprises a clock signal generating circuit for producing the shifts of the shift registers of the sensor strip, and suitable power supply circuits.

In view of the fact that the practical application of the method in accordance with the invention does not require any modification of the conventional scanning circuits employed in conjunction with the cathode-ray tube which is subjected to the measurement, the measurement operation could be performed on a television set in working order. The sole condition is that the receiver must be equipped with a video connection of the "Peritel" type (as is the case with the majority of television sets at the present time) which provides direct access to the three electron guns of the picture tube of the set. However, since the measurement is sequential, the electronic circuits of the receiver which are related to scanning sensitivity must have a sufficient degree of stability to ensure freedom from interference with the measurement.

Figure 8:
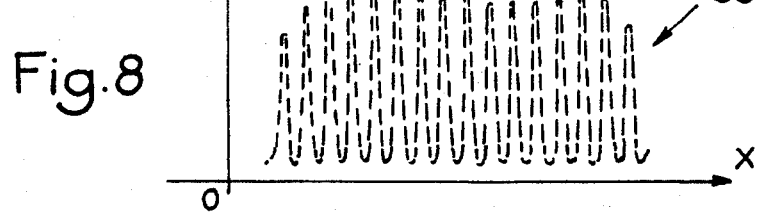
FIG. 8 is a chronogram of the signal collected by the sensor in accordance with the invention, the sensor being placed substantially at the center of the picture-tube screen which is uniformly illuminated with monochromatic light, said signal being used for calibrating the sensor.

In order to obtain a convergence component value which can readily be utilized, this value should preferably be expressed directly in the form of a real length which is measurable on the screen of the cathode-ray tube. To this end, the sensor is calibrated in the following manner. The screen is uniformly illuminated with monochromatic light (by means of any one of the three primary colors) and the sensor is placed substantially at the center of the screen, the longitudinal axis of the photosensitive strip 45 being parallel to the scanning lines of the screen. There is then obtained at the output of the sensor a signal such as the signal 59 which is represented schematically in FIG. 8 in a reference frame of orthonormal coordinates xoy. This signal 59 comprises a regular succession of similar peaks having approximately equal amplitudes and each peak corresponds to one column of phosphors. It will be noted that the slight inequality of amplitudes which can be observed in the case of the different peaks is due among other factors to a variation in intensity of the electron beam which scans the phosphors, to different photoemissivities of the phosphors and to different characteristics of the photodiodes of the photosensitive strip. Although it is clear that such irregularities also affect the signal obtained with bar patterns, they are nevertheless negligible in comparison with the variations in amplitude of this signal which are imposed by the video signal.

The number of peaks of the signal 59 is equal to the number of columns of phosphors which come within the optical field of the sensor. In the case of a field having a length of 15 mm, the number of columns and therefore of peaks is approximately eighteen while the pitch of the columns is approximately 0.85 mm. Each of these peaks is composed of approximately fifteen samples. In order to determine the rank of the center of a bar pattern in accordance with the method set forth in the foregoing, the first step accordingly consists in searching for the rank of the apex of each peak of the signal 59. The mean interval of the peaks is then calculated and expressed as a difference in rank D. It is postulated that this mean interval corresponds to the theoretical pitch of the columns of phosphors of the screen, which is known and is usually 0.820 mm. The pitch of the samples (that is to say a difference in rank equal to unity) of the output signal of the sensor is then equal to 0.820/D (this value being expressed in millimeters as measurable on the screen of the cathode-ray tube). It is then an easy matter to express the value of the convergence component in millimeters by multiplying the value of the difference in respective ranks of the centers of the bars "seen" by the sensor by the ratio 0.820/D, which is a constant of the sensor considered.

What is claimed is:

1. A method of measuring the convergence of a three-gun shadow mask cathode-ray tube, the screen of the cathode-ray tube being separated into zones for the convergence measurement of phosphors thereof, the method comprising:
    producing on the screen of the cathode-ray tube, for each of the zones wherein convergence measurement is desired, fixed monochrome bars of two different primary colors in alternate sequence, each of the bars having a photocenter;
    extending the bars over the phosphors to be measured;
    modulating the light intensity of the bars in accordance with a Gaussian distribution waveform;
    determining the photocenters of the bars with respect to each of the two primary colors;
    measuring the distance between the photocenters of the bars; and
    equating, if the distance is not zero, the distance as a measure of the convergence in the zone of the cathode-ray tube.

2. Method according to claim 1, wherein the producing step comprises:
    generating fixed vertical monochrome bars; and wherein the equating step comprises:
    equating the distance between the photocenters of the vertical bars as the horizontal component of the convergence.

3. Method according to claim 1, wherein the producing step comprises:
    generating fixed horizontal monochrome bars; and wherein the equating step comprises:
    equating the distance between the photocenters of the horizontal bars as the vertical component of the convergence.

4. Method according to claim 1, wherein the modulating step further comprises:
    utilizing a monochrome beam modulation signal for producing the fixed monochrome bars, the modulation signal being generated in digital codes and presented in the form of a succession of stair-steps, the first half of the signal having steps of constantly increasing levels and the second half of the signal having steps of constantly decreasing levels, the increasing and decreasing levels being symmetrical, the levels of the first and last steps being sufficient to ensure the detection of the illumination of the corresponding phosphors by a sensor, the maximum amplitude of the signal corresponding to the optimum dynamic range of the sensor.

5. Method according to claim 4, wherein the utilizing step further comprises:
    maintaining the time duration of the stair-step levels substantially identical.

6. Method according to claim 1, wherein the measuring step further comprises:
    placing a high resolution charge-coupled photosensor in a desired zone at right angle to a bar of the first of the primary colors;
    delivering from the photosensor a sampled output signal including multiple samples, the samples are ranked according to their weighting in the Gaussian distribution waveform, the signal being digitized linearly;
    forming for all the samples a sum N1 of the product of the numerical value of each sample with the rank of the sample;
    forming for the numerical values of all of the samples a sum N2;
    ranking the abscissa of the center of the bar for the first primary color by the ratio N1/N2;
    switching over, without displacing the photosensor, the signal to obtain a bar of the second of the primary colors;
    repeating the forming steps and the ranking step to obtain the rank of the abscissa of the sample of the bar for the second primary color;
    comparing the difference in ranks of the centers of the first and second primary color bars to obtain the value of the convergence within the desired zone.

7. Method according to claim 6, further comprising:
    illuminating the screen of the cathode-ray tube uniformly with monochromatic light to obtain the value of the convergence, the value being formed of a length measurable on the screen;
    positioning the photosensor substantially at the center of the screen, the longitudinal axis of the photosensor being parallel to the screen scanning lines;
    obtaining from the photosensor a signal having a succession of similar peaks, each peak corresponding to one column of phosphors;
    determining the mean value of pitch of the peaks, the mean interval between the peaks corresponding to the theoretical pitch of columns of phosphors;
    expressing the means value of pitch of the peaks as a difference in the ranks of samples of the signal; and
    equating the convergence value length as the difference in ranks of the centers of first and second primary color bars multiplied by the ratio between the theoretical pitch of the columns of phosphors having the same color and the mean value of pitch of the peaks.

8. Apparatus for measuring vertical or horizontal convergence components of a three-gun shadow mask cathode-ray tube, comprising:
    means for generating horizontal and vertical bars and a signal for modulating the bars, the modulating signal having a Gaussian distribution waveform, the generating means being connected through a selector to the electron guns of the cathode-ray tube;
    at least one photosensor connected to a computation circuit synchronized with the selector, the computation circuit determining the relative locations of the photocenters of the bars with respect to a reference point of the photosensor, the computation circuit further calculating the mutual distance between the reference point of the photosensor and the locations of the photocenters of the bars.

9. Apparatus according to claim 8, wherein the photosensor comprises:
a photosensitive transducer having a charge-coupled photosensitive strip, the strip including a large number of aligned photodiodes;
an optical system positioned in front of the transducer, the optical system having a magnification along the longitudinal axis thereof, the magnification corresponding to a ratio between the length of the active portion of the transducer and 2–3 times the width of the bars, the magnification of the optical system in the direction at right angle to the longitudinal axis corresponding substantially to a ratio between the width of the active portion of the transducer and the distance between the centers of two consecutive phosphors of a column of phosphors on the screen of the CRT.

10. A measuring device according to claim 9, wherein the optical system comprises a biconvex lens and a cylindrical lens.

* * * * *